United States Patent [19]

Sieber

[11] 4,101,143

[45] Jul. 18, 1978

[54] WHEELCHAIRS

[75] Inventor: William J. Sieber, Northridge, Calif.

[73] Assignee: American Safety Equipment Corporation, Encino, Calif.

[21] Appl. No.: 756,419

[22] Filed: Jan. 3, 1977

[51] Int. Cl.$^{2}$ .............................................. B62B 11/00

[52] U.S. Cl. ...................................... 280/42; 280/647; 280/650; 297/DIG. 4; 188/2 F

[58] Field of Search .............. 280/42, 647, 650, 47.38; 297/42, 45, 437, 427, DIG. 4; 188/2 F, 82.7, 82.1, 82.34, 82.4

[56] References Cited

U.S. PATENT DOCUMENTS

| | | | |
|---|---|---|---|
| 3,142,351 | 7/1964 | Green | 280/42 |
| 3,331,614 | 7/1967 | McClintock | 280/42 |
| 3,556,260 | 1/1971 | Meyer | 188/82.7 |
| 3,807,520 | 4/1974 | Chisholm | 297/DIG. 4 |
| 4,026,568 | 5/1977 | Hallam | 280/42 |
| 4,033,624 | 7/1977 | Jun | 297/DIG. 4 |

*Primary Examiner*—Robert R. Song
*Attorney, Agent, or Firm*—Poms, Smith, Lande & Glenny

[57] ABSTRACT

A wheelchair comprises a pair of frame members of one piece of solid material. A well indented into each frame member accommodates an axle for mounting a wheel therein. A pair of braces supports the frame members in a spaced-apart position and allows the frame members to be brought together. A vertical pivot pivotally mounts the brace members with respect to each other at a central portion of each brace member. Each brace member pivots with respect to a frame member about a vertical axis on an anchor. The other end of each brace member is releasably anchored to the frame member opposite the one to which the one end of the brace member is anchored. A brake on the frame moves against the wheels to lock them, and a hill holder connected to the brake prevents movement of the wheels in one direction. A brake handle is movable between at least two positions, a locking one and a hill holder one. The handle is mounted in an indentation on each frame member adjacent the well. The brake passes through the well upon movement of the handle to the locking position and the hill holder passes through the well upon movement of the handle to the hill holding position. Side members are mounted on the top of the frame members to extend either upward or outward from each frame member. There is also a foot rest housing, a telescoping section extending downward from the housing and a mounting bracket for mounting a foot rest on the telescoping section. A grip on the top part of the housing is connected to the telescoping section within reach of the user whereby pulling the grip raises the foot rest. A seat supporting the user between the frame members includes a platform mounted below the top of the frame. A pit is provided in the platform, and a cushion on the platform extends into the pit. The cushion is flush with the top of the frame members.

56 Claims, 15 Drawing Figures

WHEELCHAIRS

BACKGROUND OF THE INVENTION

The invention generally relates to improvements in wheelchairs. Wheelchairs are useful in providing mobility for persons unable to walk. They are formed in various configurations, but today's standard wheelchair is usually formed with a tubular metal frame with a seat stretched on the frame. The frame supports main drive wheels on a tubular member, and secondary wheels are provided for balance and steering. Some chairs are collapsible so that they can be stowed when not in use; some are motorized while others are only manually operable.

More and more facilities are being designed to accommodate persons in wheelchairs. However, it is often difficult with present wheelchairs to accommodate wheelchairs without substantially increasing costs of such facilities. Because present wheelchairs are wide, it is often difficult to move a wheelchair through doors, into toilets, down airplane aisles and into other similar locations. Wider facilities can be built, but oftentimes it is at the sacrifice of area needed for other purposes. Existing facilities are expensive to convert, and in some situations it is considered impractical to provide for the width of a wheelchair, and other accommodations often must be made. For example, airplane aisles are normally too narrow for a wheelchair. A narrower wheeled seat often must be provided for moving a paraplegic in an airplane.

Many wheelchairs are collapsible. However, it is important to have the collapsed size as small as possible. In present wheelchairs, the collapsed size is often quite large because the hubs of the wheels extend outward adding width to the wheelchair, and the cross braces holding the wheels apart often cannot assume a completely collapsed orientation. Some prior art wheelchairs had frame members which could telescope outward as the chair was collapsed. Although some chairs were able to decrease the collapsed width, the height or the horizontal extension of the chair was increased as a sacrifice thereof which increased the size of the wheelchair to be stowed. It is therefore an object of the present invention to provide a relatively narrow wheelchair that does not sacrifice seat space to the user, which can be collapsed more narrowly than prior art devices.

Stainless steel or plated tubular steel is usually used for the frame of wheelchairs because it is necessary for strength. However, metal wheelchairs are very heavy. For example, a standard wheelchair weighs approximately 60 pounds (27 kg), and it is difficult to lift or move one. Metal tubing of the prior art wheelchairs can be bent because of the rigidity of the tubing. This type of damage occurs when the user runs into an object such as a high curb or when the wheelchair is transported in the collapsed condition. Slight bending of the tubes causes misalignment of the wheels resulting in a chair that is difficult to drive. Therefore, even though such chairs are heavy, the frames can easily be bent sufficiently to damage the chairs. It is an object of the present invention to provide for a lightweight chair of substantial strength which will not be damaged when encountering curbs or other objects.

Prior art wheelchairs were often difficult to open and close especially if such opening and closing was being done by the user of the chair. It is an object of the present invention, therefore, to provide a chair which is easy to open and close.

Many prior art wheelchairs that accommodate adults are usually too wide for children, and adult wheelchairs either have to be modified for a child or special child-sized chairs must be built. This is unfortunate because as the child grows, a new wheelchair will have to be purchased or the modifications of the smaller chair will have to be removed and replaced by the standard adult-sized chair components. It is an object of the present invention to eliminate the need and the associated cost burden for different sized wheelchairs of modifications of existing wheelchairs or a substitution of different-sized ones.

Rolling wheels have a tendency to pick up water on wet pavement and throw it upward. This is a problem in prior art wheelchairs where users are frequently splashed with water. It is an object of the present invention to prevent water and mud from being thrown at the user, and it is a more specific object to provide a mud and water guard in the wheelchair frame. Another object is to incorporate the mudguard into the frame so that the wheels do not have to extend outward beyond the frame.

Some persons almost "live" in their wheelchairs. A padded seat is often necessary to prevent sores from developing on the pelvic and thigh muscles. The tissue surrounding the pelvis of those having legs amputated is especially tender and subject to becoming ulcerated. The prior art solution to that problem has been to provide cushioning on the wheelchair seat. However, this has a tendency to raise the center of gravity of the chair by raising the person in the chair. Raising the center of gravity makes the chair more unstable to the possible endangerment of the user. This is especially true to persons having had legs amputated because without legs, the center of gravity of the wheelchair-person combination is initially higher. Raising it higher by the addition of cushions makes the wheelchair even more unstable. It is an object of the present invention to allow for cushioning of the seat while maintaining a low center of gravity. Another problem with cushioning is that it is often necessary to provide less cushioning on certain parts of the seat and a softer surface under sore areas. This can be difficult in prior wheelchairs, and it is an object of the present invention to alleviate the problem. A further problem with cushions is their tendency to slip on the seat. An object of the present invention is to eliminate the slipping problem.

Prior wheelchairs had brakes for preventing all movement of the wheelchair, and some chairs had hill holder features that prevent backward movement of the wheelchair while permitting forward movement. Without such a feature, when the user is driving the wheels and encounters a hill, he must thrust the wheels in the forward direction, release and quickly grab the wheels again at the start of the drive motion, or else the wheelchair will roll backwards. A hill holder allows the user to rest between forward movement and is an additional safety feature. However, in prior art devices, the brake and hill holder were mounted separately at different locations. Their mounting had to be accommodated on the tubes of the frame. Moreover, mounting them on the outside of the frame adds potential width to the frame. The handles also can catch clothing or other objects. It is an object of the present invention to combine the brake and hill holder into one unit with one handle. Another object is to mount the handle within easy reach of the person in the chair, and another object is to have the handle located so that it does not extend outside of the frame.

Persons depend on wheelchairs for freedom. Having a chair that is more mobile is important but having one which offers easy ingress and egress may be equally consequential. For example, it is of little benefit to the user of a wheelchair if the chair provides sufficient mobility to maneuver into a toilet stall if he cannot leave the chair to use the toilet. If egress is easy but the configuration of the chair prevents close approach to the commode, the easy egress is wasted. The frame in many prior art wheelchairs prevented the user from getting close to a commode. It is an object of the present invention to design the chair so that commode access is ensured.

It is often desirable to enter or leave a wheelchair from the side rather than from the front or rear. This has been accomplished in the past by having sides that fold downward or are removable. Sidewalls have been provided so that they can straddle from the seat to a remote location so that the user can slide himself along the extended sideboard. However, these prior art devices have met with certain problems. First, the main wheels often interfered with deployment of the sideboard. Also, the sideboards often had difficulty reaching the remote location because of the projecting width of the wheels and the short projection of the sideboard. It is an object of the present invention to provide a wheelchair which allows for transfer along a side panel to a more remote location. It is another object to provide the chair so that the wheels will not interfere with the deployment of the sideboard.

Another problem of prior art wheelchairs has been in the footrest. Ideally, they should be adjustable both forward and backward and up-and-down. However, this adjustment is often difficult for the wheelchair user to make because the footrests are often out of reach. Therefore, it is an object of the present invention to provide footrests which are adjustable with the adjustment being within reach of the user. It is also an object of the invention to have the footrests being foldable toward the center of the chair when the chair is collapsed so that the footrests do not add length or width to the collapsed chair.

Because the wheelchair is often a person's "home," it is desirable that conveniences be provided for him. For example, one of the objects of the present invention is to provide a tray located within easy reach of the user's arms for supporting food or other materials. In order to save materials and their weight, it is an object to incorporate the tray into other parts of the wheelchair so that the trays's parts perform other functions.

The above specific objects and other objects will be discussed in more detail hereinafter. The present invention also has as its object the construction of a low-cost wheelchair with low maintenance costs. A further object is to provide a chair with molded parts rather than tubular parts that require welding for assembly. Another object of the present invention is to construct the wheelchair so that it is easily cleaned. All of the above objects are met by the present invention, and other objects which are also met will be evident from the remaining description of the invention.

SUMMARY OF THE INVENTION

One of the main features of the present invention is the use of one piece side frame members formed of foamed plastic. The frame is supported by a somewhat X-shaped brace having brace members which may be somewhat S-shaped. One end of each brace member is anchored to each frame for pivoting about a vertical axis. At the center of the X is another pivot, also about a vertical axis. The front ends of each brace are mounted for sliding along the forward part of the frame, and they can be locked in a plurality of positions to prevent sliding and to hold the chair in a particular orientation. The brace is unlocked easily by the user in the chair, using a common release for both locking means.

A transfer panel is also provided on each frame member. The transfer panels have brackets which extend into brackets mounted on the top of each frame member so that the side members extend upward near the edges of the seat. The side members are hinged about the top thereof, and the armrest, which is pivotally mounted on the chair, pivots to lie on the top of the side members. Because the side members are hinged in their center, the outside portion can be hinged upward and braced against the inside portion to act as a tray near the armrest.

The side members can also be removed from the frame members. When the side members are unfolded after removal, brackets provided on both portions are positioned so that they can be engaged by the brackets on the frame. After unhinging open side members, they are pivoted so that what had been the forward end of the side members now extends outward from the side of the wheelchair at seat level. The outside portion of the open side members can be rested on another seat such as an automobile seat, and the user can slide therealong into the automobile.

Brake means are mounted on the frame for movement against the wheels for preventing rotation of the wheels, and hill holder means, which are connected to the brake means, prevent movement of the wheels only in the aft direction. The hill holder means includes a cam that is gripped by the wheel and pivoted against the wheel when the wheel rotates in one direction and is pivoted out of the path of the wheel when the wheel rotates in the other direction to ride along the wheel. A handle is movable between at least two positions and the brake and hill holder means are connected to the handle. The handle is mounted adjacent the wheel well and the brake and hill holder extend into the wheel well. When the handle is moved to a first position, the brake extends through the wheel well and locks the wheel and moves the hill holder out of the wheel well. In a second position, the handle moves the hill holder against the wheel through the wheel well, and it simultaneously moves the brake out of the wheel well. The handle is mounted in an indentation on each frame member so that the handle does not extend beyond the outside plane of the frame.

A footrest is mounted on the frame member. The forward portion of the frame member is inclined and the footrest is mounted in a housing aligned with the incline. A telescoping means extends downward from the housing and terminates in a mounting bracket for mounting the footrest. A grip which is connected to the telescoping means is on the top part of the housing within reach of the user. Pulling the grip raises the footrest so that the user can adjust it.

The footrest is also mounted to be adjustable in the plane of the footrest. The footrest can be mounted on a tubular slide which permits the footrest to move along the plane of the slide. A modified footrest has a lip extending on the rear end of the upper surface of the footrest and a lip extending from the forward end of the lower surface of the footrest. The footrest is mounted so that it can be rotated about an axis and reversed with the front lower lip being moved to become the rear upper lip. Because the axis is off-center, the fore-aft position of the footrest changes.

The wheelchair seat includes a platform that is stretched between the frame members. The platform has a pit, and a cushion extends into the pit and extends upward therefrom and is flush with the top of the frame members. The pit allows for deeper cushioning and also holds the remaining portion of the cushion above the top of the pit on the platform.

BRIEF DESCRIPTION OF THE DRAWINGS

FIG. 1 is a perspective view of the wheelchair of the present invention.

FIG. 2 shows the underside of the side member of the present invention extending from a frame member. The side member is in the open condition.

FIGS. 3 through 5 show the configuration of the combined brake and hill holder. FIG. 3 shows the brake-hill holder in the neutral position. The second position of the brake-hill holder is shown in FIG. 4 with the cam of the hill holder against the wheel. The braking or first position of the brake-hill holder is shown in FIG. 5, and the brake is against the wheel.

FIG. 7 is a side sectional view taken through the plane VII—VII in FIG. 6 and shows some detail of the footrest, brace, seat, frame and side members.

FIG. 8 shows detail of the footrest looking from the top of the collapsed wheelchair.

FIG. 9 is a sectional view taken through plane IX—IX in FIG. 7 showing the releasable fastening means for fastening the forward portion of each brace to the frame.

FIG. 10 is a sectional view taken through plane X—X of FIG. 9 showing details in the releasable anchor.

FIG. 13 is a perspective view from the forward quarter showing the wheelchair of the present invention in the collapsed condition.

FIG. 14 is a perspective view of the wheelchair from the rear quarter showing the side members deployed as transfer panels for transferring the user from the wheelchair seat to a remote location.

FIG. 15 is a partial perspective view from the rear quarter showing part of the side member pivoted upward to act as a tray. The portion acting as a tray is braced against the other part of the side member.

DETAILED DESCRIPTION OF THE PREFERRED EMBODIMENT

Figure 1:
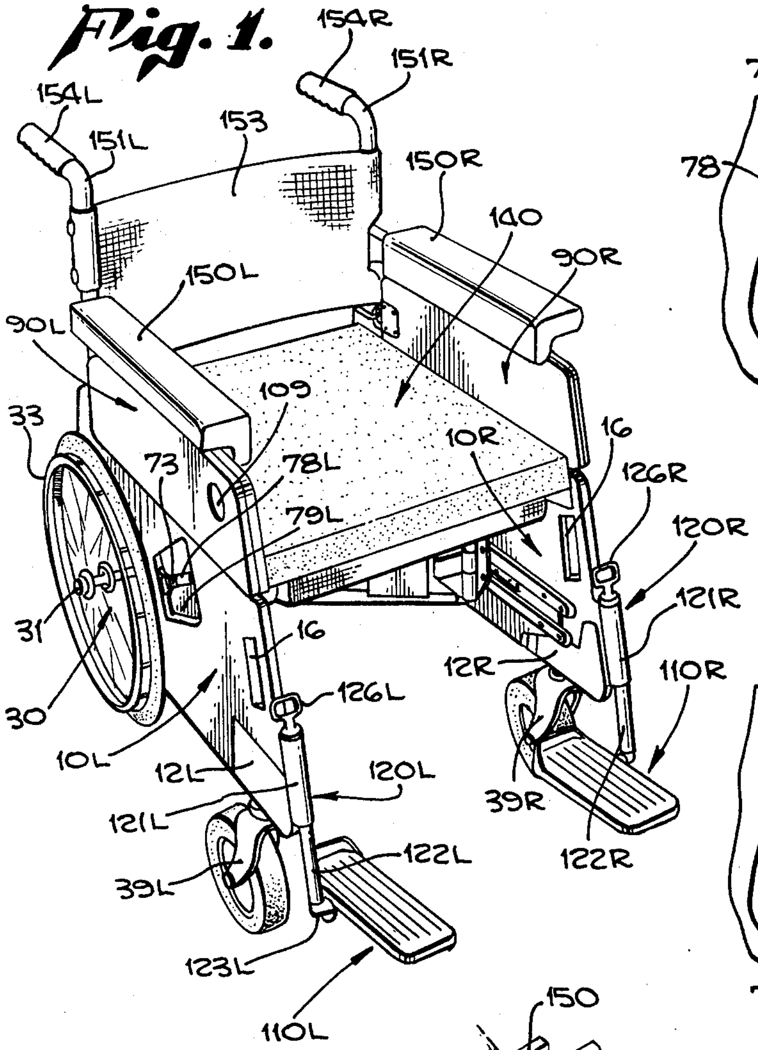
FIGS. 1 through 5 appear on sheet 1.

With some minor exceptions set forth hereinafter, the wheelchair of the present invention is generally symmetrical about a vertical plane extending from the front to the rear of the wheelchair through the center. In order to avoid duplication of reference numerals, where an element and its mere image counterpart appear in the same drawing, they have reference numerals differing only in the additional "L" or "R" added to the reference numeral to designate left or right side of the wheelchair for an observer facing the front of the wheelchair. In the foregoing written specification, "R" and "L" are frequently omitted when an explanation of the function of one of the members would suffice for the explanation of the other. For example, the wheelchair includes a pair of frame members. These are referred to as frame members 10 although in the drawings (FIGS. 1, 6, 11, 12, 13 and 14) the "R" and "L" designations appear. Where necessary in the written specification, the "L" and "R" designations will appear.

The Wheelchair Generally

Each frame member 10 is formed of one piece of material. The chair also includes a pair of wheels 30, and well means 11 (FIGS. 6, 11, 12 and 14) are indented into the frame for accommodating a wheel therein. A mounting means in the form of axle 31 for mounting a wheel for rotation is provided in each well 11. Castor wheel 39 is provided at the forward end of the wheelchair for balancing and steering it.

Figure 6:
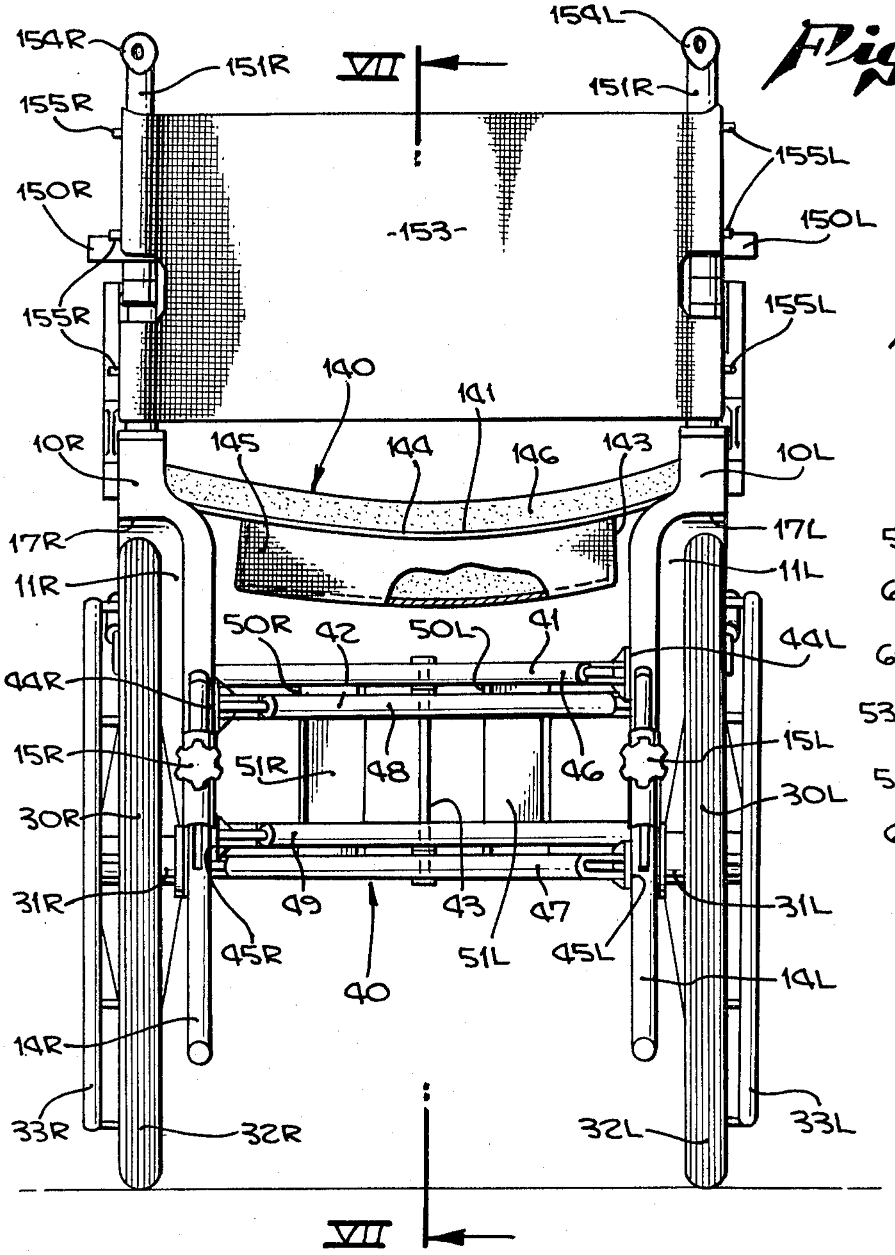
FIG. 6 (sheet 2) is a rear elevational view of the wheelchair of the present invention showing in some detail the rear of the frame, the brace and the seat.
Figure 11:
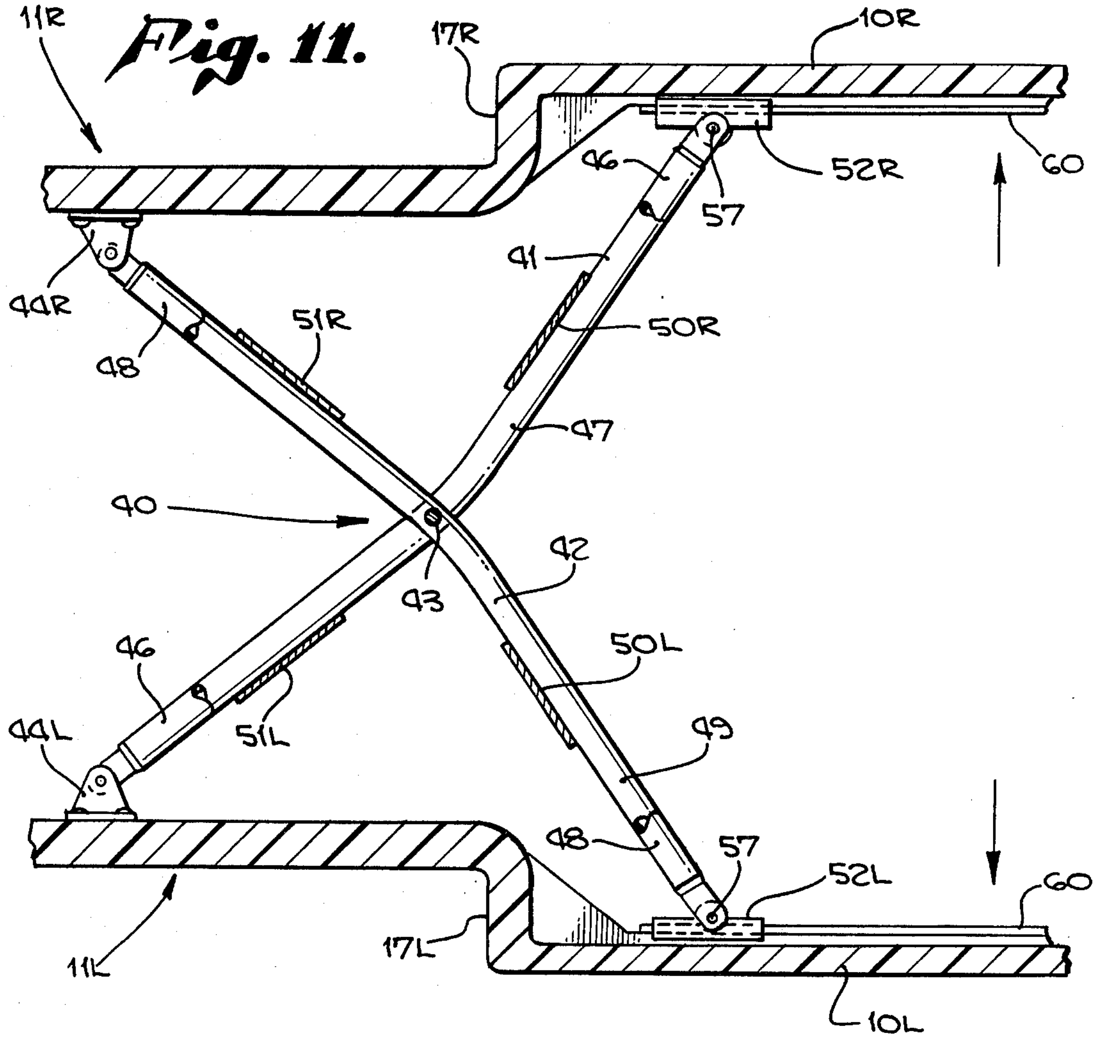
FIGS. 11 and 12 are on sheet 4 and show the foldability of the bracing of the present invention. Both are taken through plane XI—XI of FIG. 7. The open condition of the wheelchair is shown in FIG. 11 and the closed, collapsed condition of the chair is shown in FIG. 12.
Figure 12:
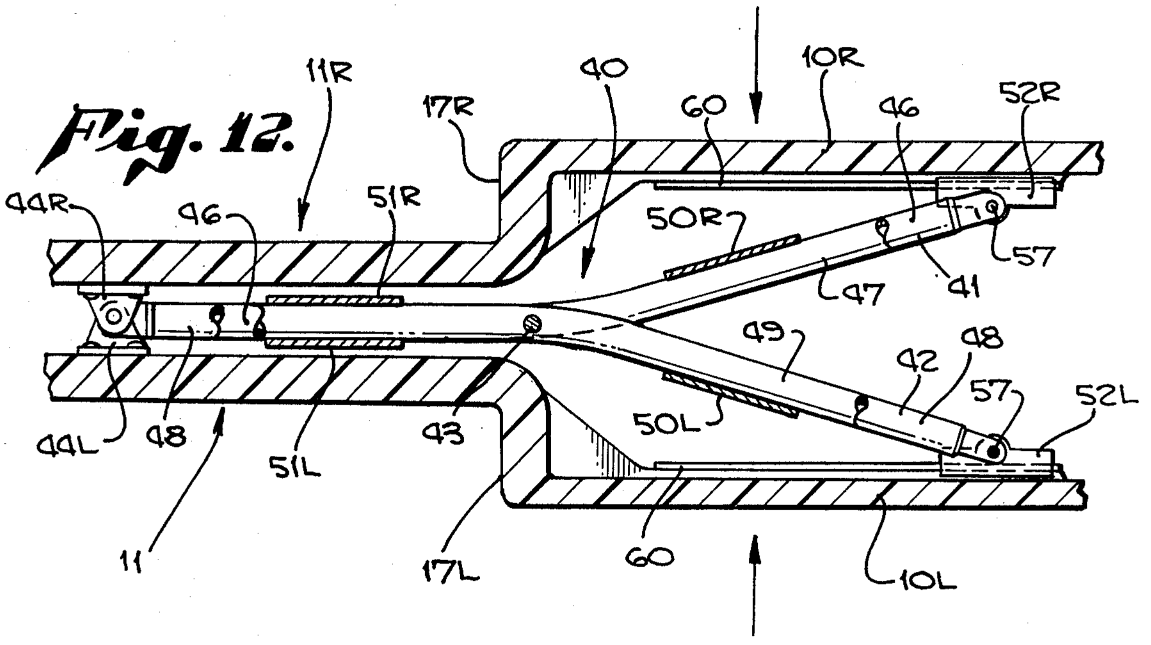

Brace means 40 (FIGS. 6, 7, 11 and 12) supports the frame members in a spaced apart, open position (FIGS. 6, 11) and allows the frame members to be brought together to a collapsed position (FIG. 12). Brace means 40 comprises a pair of brace members 41 and 42 and vertical pivot means 43 for pivotally mounting about a vertical axis the brace members with respect to each other at a central portion of each brace member 41, 42. Anchoring means 44, 45 on each frame member anchor one of the brace members 41 or 42 to a frame member for pivoting the brace member with respect to the frame member about a vertical axis. As will be explained in more detail hereinafter, brace member 41 has an upper tubular member 46 and a lower tubular member 47 with means 50 connecting the upper and lower tubes. Brace member 42 includes upper tubular member 48 and lower tubular member 49 connected by means 51. The upper tubular members 46 and 48 are connected to anchoring means 44 (tubular member 48 being connected to anchoring means 44R and tubular member 46 being connected to anchoring means 44L), and tubular members 47 and 49 are connected to anchoring means 45 (FIG. 6).

Releasable anchoring means releasably anchors the second end of the brace members to the frame member opposite the one to which the one end of the brace member is anchored. As shown in FIG. 11, one end of brace member 42 is anchored to anchors 44R, 45R on frame member 10R, and the other end of brace member 42 is anchored to releasable anchor 52L on frame member 10L. Structure which is described in more detail hereinafter, is provided to allow releasable anchor 52 to slide along the frame member from a position shown in FIGS. 7 and 11 with the wheelchair in the open position to the position shown in FIG. 12 with the wheelchair in the collapsed position. This collapsing is also described in more detail hereinafter.

Figure 5:
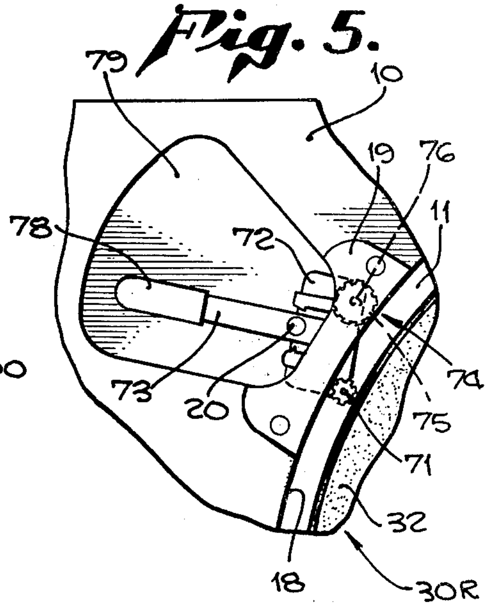
Figure 13:
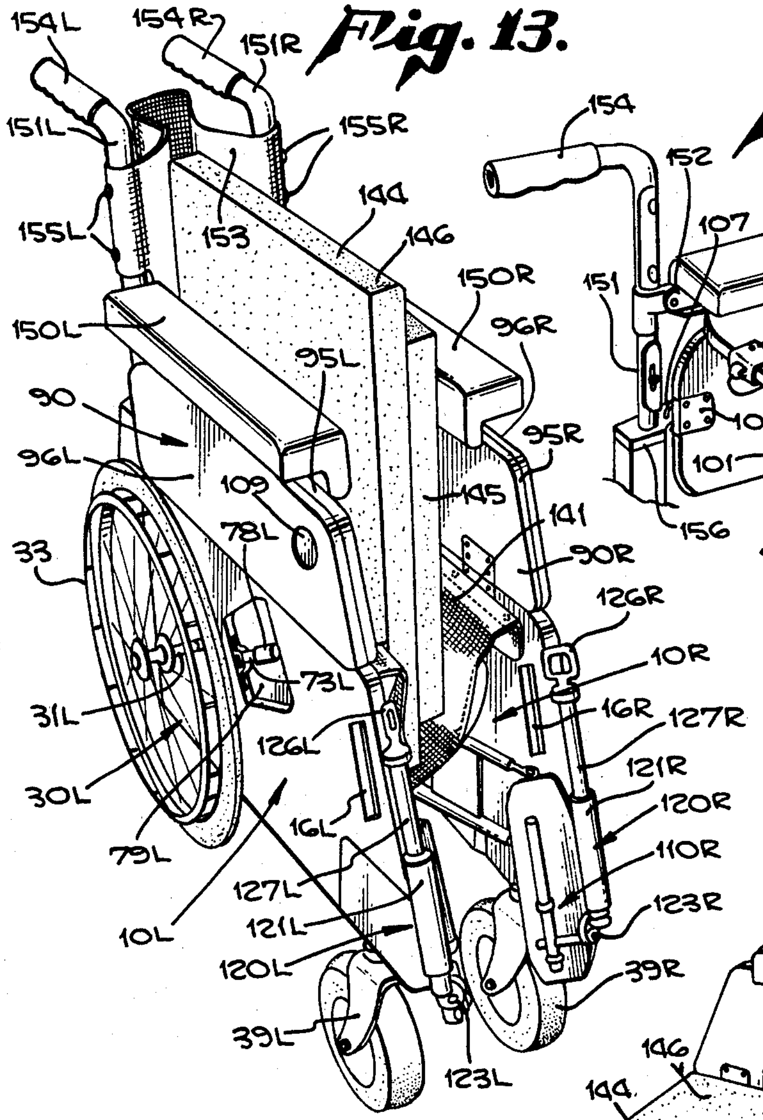
FIGS. 13 through 15 are on sheet 5.

The wheelchair also includes brake means mounted on the frame means for movement against the wheels for preventing rotation of the wheels. As shown in FIG. 5, brake member 71 is mounted on plate 72 which in turn is connected to handle 73. Handle 73 is mounted in indentation 79 in frame member 10. As shown in FIGS. 1 and 13, the indentation is adjacent well means 11. Means in the form of a slot are provided for passing brake means 71 through well means 11 against tire 32 upon movement of the handle 73 to the FIG. 5 position.

Figure 3:
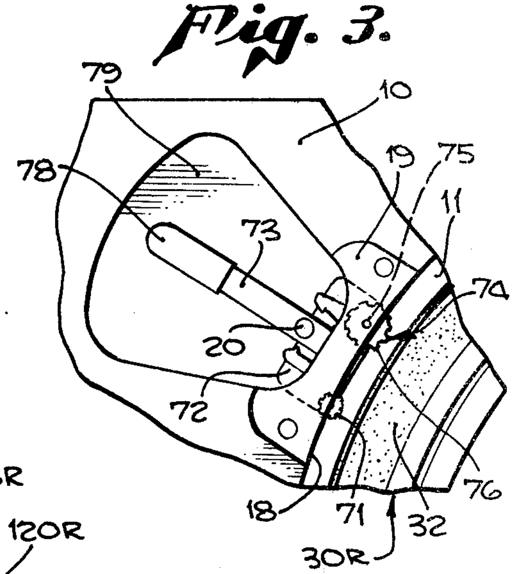

The wheelchair also includes a hill holder means 74 mounted opposite brake 71 on plate 72. Hill holder 74 includes cam 75 eccentrically mounted to plate 72 on pin 76. The hill holder means prevents movement of the wheels in one direction, and its operation is explained in more detail hereinafter. Briefly, however, handle 73 is movable between two positions. The first position has previously been discussed with reference to FIG. 5 wherein brake 71 is against tire 32. In the second position, shown in FIG. 4, handle 73 moves cam 75 against the tire. Because of the eccentric mounting of cam 75 on plate 72, counterclockwise rotation of the wheel (FIG. 4) tends to pivot cam 75 clockwise so that is does not grip tire 32. However, reverse movement of the wheelchair rotates wheel 30 in a clockwise direction. Tire 32 tends to rotate cam 75 counterclockwise digging the cam into tire 32 and eventually preventing rotation of wheel 30. Means are also provided for passing the hill holder means through well means 11 upon movement of the handle to the FIG. 4 position. Handle 73 also has a neutral position (FIG. 3) with both the brake and the hill holder out of engagement with the wheel.

The wheelchair of the present invention also includes side members 90 and means for mounting the side members on the top of frame members 10 in a first position (FIGS. 1, 7, 13 and 15) wherein side members 90 extend upward from each frame member 10. Side members 90 are also positionable in a second position (FIGS. 2 and 14) wherein the side members extend outward from frame members 10.

Footrest means 110 and means 120 for mounting the footrest means 110 on frame members 10 are part of the wheelchair of the present invention. The means for mounting the footrest means on the frame members include a housing 121 and telescoping means 122 extending downward from housing 121 and having a mounting bracket 123 for mounting footrest means 110 thereon. Gripping means 126, provided on the top part of housing 121, are connected to the telescoping means 122 and are positioned within reach of the user (FIG. 1). Pulling grip 126 raises the footrest means 110.

As shown most clearly in FIG. 6, the wheelchair also includes seat means 140 for supporting a user between frame members 10. The seat means comprises platform means 141 (FIGS. 6, 13) and means 142 (FIG. 7) for mounting the platform means below the top of the frame means. Pit means 143 is also provided in platform means 141. A cushion 144 on platform means 141 extends into pit means 143. The top of the cushion is generally flush with the top of frame member 10.

The Frame Members

In the wheelchair of the present invention, frame members 10 are formed of one piece of material. Although the frame members could be hollow or have hollow cavities, the preferred embodiment is generally solid. It has been found that foamed plastic material in the one-piece configuration of the invention offers significant advantages over prior art metal tubular frames. Noryl, a modified polyphenylene oxide thermoplastic, manufactured by General Electric, which has been foamed to an approximate 0.8 density may be used as the material for the frame members. It has been found that this material gives sufficient rigidity to the chair while being significantly lighter in weight than conventional metal tubular wheelchair frames. The frame members have some flexibility so that if the wheelchair runs into a hard object such as a curb, the flexibility of the chair absorbs the shocks and the material returns to its original position. Metal tubular members, on the other hand, have a tendency to bend and deform slightly which can cause the wheelchair to become out of alignment.

Figures 7, 8:
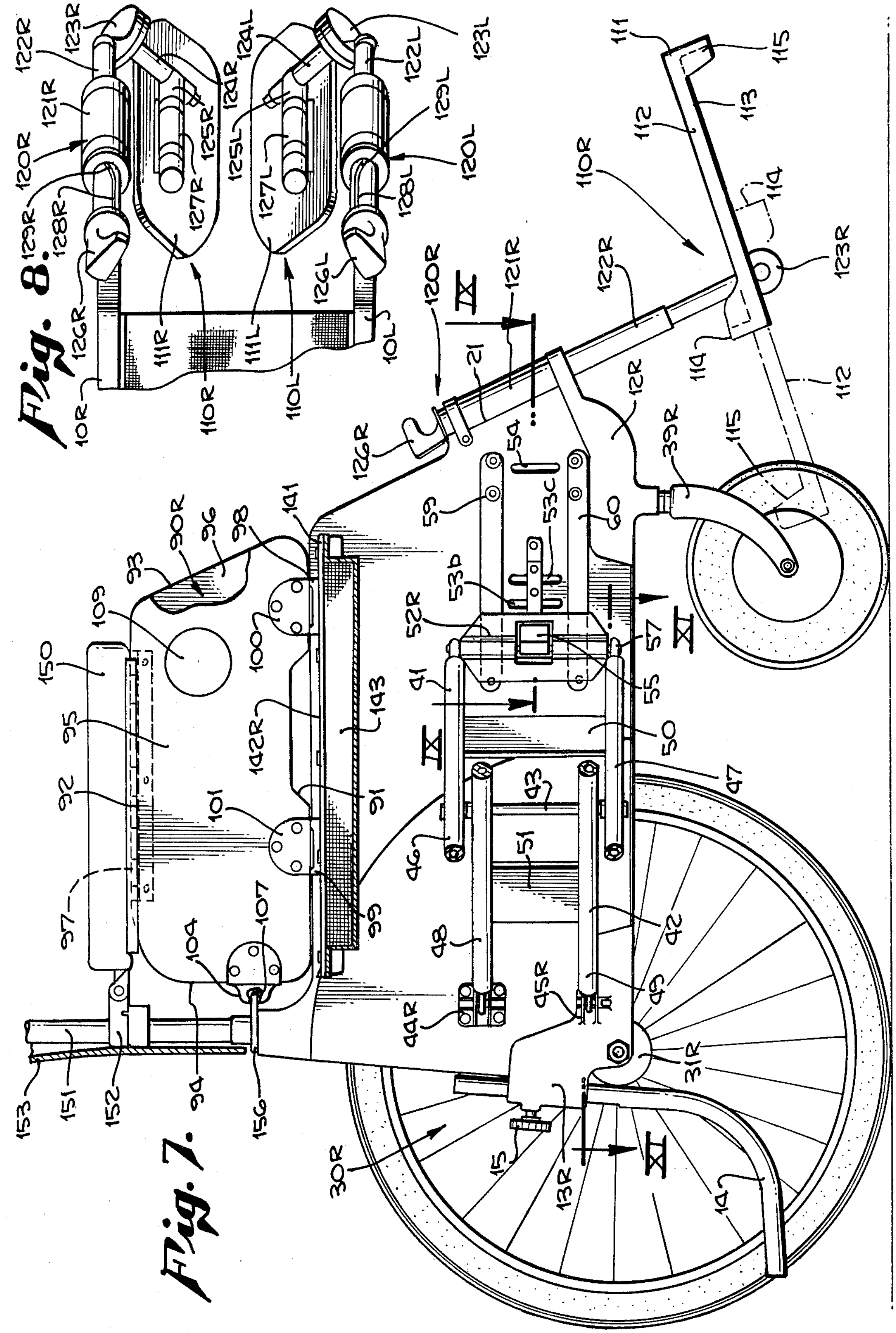
FIGS. 7 and 8 are on sheet 3.

Metal plates may be mounted at locations where localized forces occur. For example, plate 12 is mounted at the lower forward portion of each frame member (FIG. 1) for supporting castor 39 because the connection from the castor to the frame is over a small area, and the forces from the castor are relatively high. Plate 12 apportions the forces from castor 39 over a larger area of frame member 10. Likewise, plate 13 is provided at the lower rear of each frame member for supporting axle 31 (FIG. 7). In the exemplary embodiment, anchor 45 is also mounted to plate 13 to give more support to the braces. Tip preventer 14 is also attached to plate 13. It prevents the chair from tilting backwards and spilling the user. Tip preventer 14 may be adjusted by means of set screw 15.

Another advantage of having one-piece frame members is the provision of well means 11 in which wheel 30 is mounted. As stated above, one of the drawbacks of prior art wheelchairs was the excessive width which made it difficult to pass through doorways and other narrow places. By mounting wheel 30 in well 11, the frame members 10 can be spread apart sufficiently wide to provide a wide enough seating surface without increasing the width of the chair between the outside of the wheel hubs. Because wheel 30 is within well 11, water, mud and dirt are thrown against the well rather than up at the user. A conventional chair having a tubular frame has no provision for blocking debris, and the debris often dirties all of the chair. The solid frame members prevent most of the dirt and water which the wheels would normally throw upward from being forced between the frame members to dirty the braces and the anchoring means. The one-piece molded frame members also are easier to clean when they do get dirty. The area of welds where two or more tubular members are joined in conventional chairs is especially difficult to clean.

Aperture 16 (FIGS. 1, 13) may be provided to assist in gripping the chair when collapsing or opening it.

Many of the other features of the present invention depend at least in part on the configuration of the frame member. They are described in greater detail hereinafter. For example, the brace means that holds the frame members apart and allows for collapsing the frame members together interacts with the solid frame members. The brake and hill holder system also cooperate with the frame in that they extend through well 11 to contact tire 32. Handle 73 also fits within indentation 79 at a location within reach of the user but protected from grabbing obstacles. Footrest means 110 is also mounted on the frame on the forward wall thereof. The sloping of forward edge mounts the housing 121 at an angle so that adjusting telescoping means 122 not only positions the footrest vertically, a horizontal positioning is also affected. Side members 90 also cooperate with frame members 10. In the first position (FIG. 1), side members 90 extend upward from the frame members, and in a second position (FIG. 14), the side member 90 is opened up and attached to the frame members to extend outwardly therefrom. A bracket on the frame member cooperates with a bracket on the side member. The seat also cooperates with the frame members in that the platform means 141 is supported between the frame members, but the cushion 144 is flush with the top of the frame member to permit easy ingress and egress from the chair.

Brace Means

The brace means 40 of the present invention is shown in detail in FIGS. 6, 7, 9, 10, 11 and 12. The brace means comprises a pair of brace members 41 and 42 and vertical pivot means 43 for mounting the brace members with respect to each other at a central portion of each brace member about a vertical axis. This is best shown in FIG. 11 in the preferred exemplary embodiment where brace members 41 and 42 pivot about pin 43 along a vertical axis. Anchoring means 44 and 45 on each frame member anchor one end of each brace member to a frame for pivoting the frame members with respect to the frame member about a vertical axis. Anchor 44 is shown in FIG. 11 and anchor 45 is shown in FIGS. 6 and 7. Each brace member 41 and 42 comprises a pair of tubular members, brace member 41 including tubular members 46 and 47, and brace member 42 including tubular members 48 and 49. The tubular members are parallel to each other. Vertical stay means 50 and 51 support the brace members. Because each brace member has two tubular members, the anchoring means in the preferred exemplary embodiment has two anchors 44 and 45.

Releasable anchoring means are also provided for releasably anchoring the second end of the brace members to the other frame member to which the one end of the brace member is anchored. For example, in the exemplary embodiment, brace member 42 is anchored to anchoring means 44R, 45R and also connected to releasable anchoring means 52L.

Figure 9:
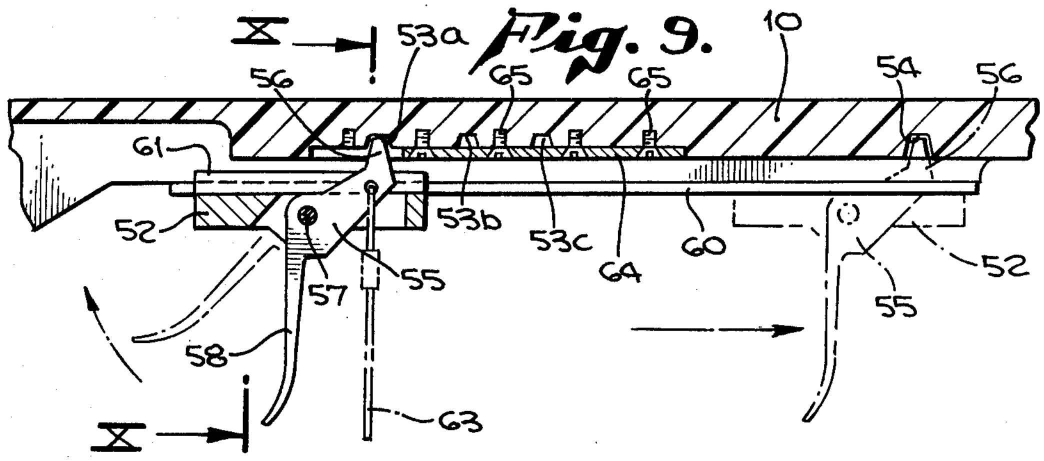

The releasable anchoring means comprises fastening means for anchoring the brace members at one of at least two locations on the frame members whereby at one location the wheelchair is in the open condition, and at the other location the wheelchair is in the collapsed condition. In FIG. 7, the wheelchair is in the open position. The fastening means has a number of apertures 53*a*, 53*b*, 53*c* and 54 (FIGS. 7 and 9). Buckle means on each brace member has probe means for being received within the aperture means. In FIG. 9, buckle means 55 includes probe means 56 which is shown in aperture 53*a*. When releasable anchor 52 moves to the phantom position in FIG. 9, probe 56 on buckle 55 moves into aperture 54 and the chair is in the collapsed position of FIG. 12. Buckle means 55 has means for moving probe means 56 into and out of aperture means 53 or 54. As shown in FIG. 7, releasable anchor 52 is mounted between tubular members 46 and 47, and the tubular members can pivot about releasable anchor 52 through pin 57 (FIG. 7). In the exemplary embodiment, pin 57 extends vertically through releasable anchor 52. Buckle 55 also pivots about pin 57, and by moving handle 58, probe 56 can be moved into and out of aperture 53 or 54.

Figure 10:
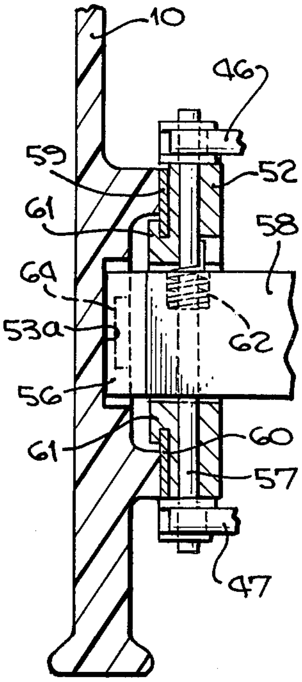
FIGS. 9 and 10 are on sheet 2.

Guide means supports the buckle means adjacent the aperture means so that the probe means are urged into the aperture means to secure the brace members to the releasable anchors. Guide means 59 and 60 (FIGS. 9 and 10) are shown in the exemplary embodiment. The guide means may either be formed integrally during molding of the one-piece frame members 10 or the guide means may be attached to the frame members during construction. A lip 61 extends between guide members 59 and 60 on releasable anchor 52 to prevent the releasable anchor from moving away from the inside wall of frame member 10 (FIGS. 9 and 10). Buckle 55 is biased by spring 62 (FIG. 10) to the solid position in FIG. 9 with probe 56 in aperture 53a.

Linkage means positioned within reach of the user in the wheelchair connects the two handle means on each releasable anchor. When the linkage is pushed or pulled, the linkage rotates the handle means to generally simultaneously remove both probe means from the aperture means. Referring again to FIG. 9, linkage 63 comprises a wire or other connection and is attached to both buckles 55. When the user decides to collapse the wheelchair, he need not reach both handles 58 simultaneously; he merely pulls or pushes on wire 63 which simultaneously pulls probes 56 out of apertures 53.

In the exemplary embodiment, at least three apertures are provided on each frame member. The apertures may either be formed in the molding process or may be cut out of the frame member prior to assembly. In the exemplary embodiment, aperture means 54 is mounted to anchor the brace means to the frame member when the wheelchair is in the collapsed condition (FIG. 12). The at least two other apertures are shown in the exemplary embodiment as apertures 53*a*–53*c*. By choosing the aperture into which probe 56 falls, the distance (width) that the frame members are apart can be adjusted. When probe 56 is in aperture 53*a*, the frame members 10 are spaced apart a maximum distance, and when probe 56 is in aperture 53*c*, the wheelchair is in the narrowest configuration other than the collapsed one. A narrower spacing of the frame members may be advantageous for a child or other small person where too wide a spacing would make driving the wheels difficult. The present invention allows for adjusting the width of the wheelchair in a quick and easy manner.

Programming means may also be provided for covering at least one aperture of the set of apertures for preventing the probe from entering the covered aperture which would stop the chair from collapsing or opening. In FIG. 9, the covering means comprises a plate secured to frame member 10 by means of screws 65. Plate 64 is shown covering apertures 53*b* and 53*c* but exposing aperture 53*a*. When probe 56 is released from aperture 53*a*, it is prevented from entering apertures 53*b* and 53*c* and will slide along the inside of frame 10 until it reaches aperture 54. Plate 64 could be reversed to expose aperture 53*c*, and two smaller plates could be used to cover apertures 53*a* and 53*c* while exposing 53b.

As shown in FIGS. 11 and 12, each brace member 41 and 42 is curved outwardly toward its releasable anchoring means from the vertical pivot 43 whereby the brace members can reach the releasable anchoring means when the wheelchair is in the collapsed condition (FIG. 12). In the exemplary embodiment, each brace member is S-shaped curving outwardly from the vertical pivot means to the releasable anchoring means. As shown in FIG. 12, the curvature of brace member 41 and 42 from vertical pivot 43 directs the brace members 41 and 42 to the releasable anchors while the relatively straight portion from the vertical pivot 43 to anchor 44 is accommodated in the narrowed portion caused by the indentations of well 11. The portion from vertical pivot 43 to anchor 44 may also be curved somewhat so that the tubular members of brace means 40 meet the anchors 44 and 45 at a slight angle. As shown primarily in FIG. 12, the collapsed position of the wheelchair of the present invention has the side frame members very close to each other. Little space is wasted. This is an important feature of the present invention because it is desirable to minimize the width of the wheelchair in the collapsed position for stowing it.

As noted in FIG. 12, in the stowed position the brace members 41 and 42 do not extend beyond the forward edge of frame members 10 but are between the frame members. Therefore, there is no forward, rearward or vertical projection of the brace members which can add to the overall dimension of the collapsed wheelchair. Also, no parts are removed or disconnected from each other, and it is unlikely that parts could be lost. The releasable anchor 52 merely slides along the inside of frame members 10, but lip 61 holds releasable anchor 52 to guides 59 and 60.

The bracing system of the present invention is also very strong. Part of the strength results from the spacing of the tubular members which absorb forces in their tension and compression. Stays 50 and 51 also help in giving strength to the bracing system. The curvature of the brace members 41 and 42 does not detract from the strength of the brace means, and it allows the wheelchair to be collapsed to a very narrow configuration.

Brake and Hill Holder

A wheelchair should have a brake for preventing any movement of the wheelchair, and a hill holder feature is also important for going uphill in the wheelchair. Without a hill holder, uphill movement of the chair requires the user to rotate the wheels in the forward direction and grab tubular grips 33 to stop the chair prior to its rolling backwards. The hill holder, which prevents rearward motion of the wheelchair while permitting forward motion thereof, allows the user to roll the chair forward and then thrust it forward again at his convenience.

The hill holder means comprises cam means to engage the wheel and cam mounting means for mounting the cam means such that rotation of the wheel in a direction moving the wheelchair forward causes the cam to pivot in a first direction out of the way of the rotating wheel to travel along it, and rotation of the wheel in a direction moving the wheelchair rearward causes the cam to pivot in a second direction opposite to the first direction to engage the wheel and prevent rotation thereof.

Referring again to FIGS. 3, 4 and 5, the hill holder means 74 includes a cam 75 eccentrically mounted on pin 76. Pin 76 is mounted on plate 72. In the FIG. 4 position, when wheel 30R and its tire 32 rotate in the counterclockwise direction indicating forward movement of the wheelchair, cam 75 tends to pivot clockwise so that it rides along the top of tire 32. However, when the wheelchair is moving in the rearward direction and tire 32 is rotating clockwise, the engagement of the tire with cam 75 causes the cam to pivot counterclockwise rotating it into the tire. Teeth 77 help grip tire 32.

Figure 4:
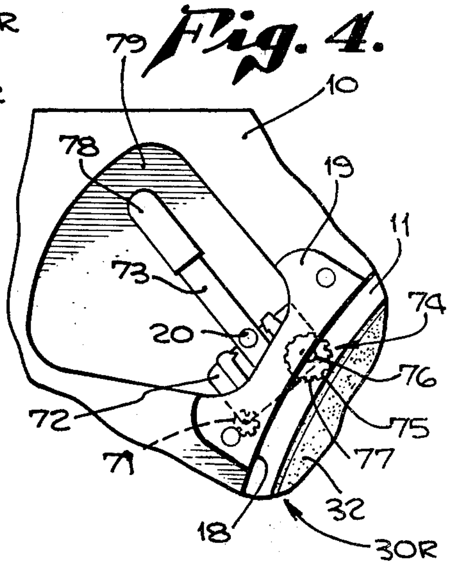

The hill holder functions when the handle 73 is in the FIG. 4 configuration because the handle is linked to plate 72 on which cam 75 is mounted through pin 20. The FIG. 4 position is one of at least two positions. In another position (FIG. 5), handle 73 is pivoted causing plate 72 to pivot to the FIG. 5 orientation so that brake member 71 which is fixed on plate 72 contacts tire 32 to stop all rotation of the wheels. The brake-hill holder system of the present invention also has a third or neutral position shown in FIG. 3.

Well means 11 include well walls 17 generally curved around the wheel to act as a mudguard. The cam and brake means are mounted on the frame means for projection through well wall 17 into and out of engagement with the wheel. When handle 73 is pivoted to the FIG. 4 configuration in the exemplary embodiment, cam 75 projects through opening 18 in well wall 17. Likewise, in the FIG. 5 configuration, brake 71 extends through opening 18 to contact tire 32.

Each frame member 10 has an indentation 79 adjacent well means 11 but near seat means 140. Handle mounting means are provided in the indentation for mounting the handle means on the frame members in the indentation to prevent the handle from projecting from the frame member and for mounting the handle within reach of the user. In the exemplary embodiment, once again a metal plate 19 is attached to frame member 10. A shaft 20 is attached to plate 19, and handle 73 pivots on shaft 20. Handle 73 is also fixed to plate 72. Moving handle 73 to the FIG. 4 position about shaft 20 moves the cam 75 against tire 32, and pivoting handle 73 to the FIG. 5 position moves brake 71 against tire 32. Handle 73 has a grip 78 to allow for easy grasping by the user.

As shown in FIG. 1, handle 73 is positioned where it can be easily gripped by the user. Because handle 73 is within indentation 79, it will not catch obstacles. This is another example of the cooperation between the handle and the one-piece frame.

The Footrest

The wheelchair of the present invention also includes footrest means on the wheelchair for supporting the user's feet. Footrest mounting means mounts the footrest on a plane for accommodating the user's foot and for movement forward and backward in the same plane. One ememplary embodiment of the footrest mounting means is shown in FIG. 7, and another embodiment is shown in FIG. 8.

In the FIG. 7 embodiment, footrest means comprises plate means 111 for supporting the user's foot. A first lip means is provided on one end of one surface of the footrest means, and the footrest mounting means mounts the footrest such that the first lip faces upward at the rear of the footrest to prevent the user's foot from falling off the footrest means. As shown in FIG. 7, the preferred exemplary embodiment has a first lip means 114 at the rear end of surface 112 of plate 111. The footrest mounting means 120 and bracket 123 mounts footrest 110 such that lip 114 faces upward at the rear of the footrest to prevent the user's foot from falling off the footrest. Lip 114 could be modified somewhat to extend completely around top surface 112 of plate 111. The lip would prevent the foot from falling in any direction off the footrest. The footrest also has a second lip 115 on the other surface 113 of the footrest and on the end opposite first lip 114.

The footrest mounting means allows rotation of the footrest one end over the other to present either the first or second lip upward to provide a support to prevent the user's foot from sliding off the footrest. As shown in FIG. 7, when plate 111 is rotated about bracket 123, what had been upper surface 112 becomes the lower surface as shown in phantom. Lip 114 now faces downward while second lip 115, which had been facing downward at the forward end of plate 111 in the solid view of FIG. 7, now faces upward at the rear of plate 111 as shown in phantom. Bracket 123 stops rotation of plate 111 in the positions shown in FIG. 7. It should be noted that plate 111 remains in the same plane before and after rotation. However, the position of the surface supporting the user's foot has changed from being farther forward in the solid view to being closer to the chair in the phantom view.

The footrest mounting means rotates the footrest about an axis away from the center of the footrest to change the position of the lip means presented toward the user. In FIG. 7, bracket 123 is near the rear of plate 111. Therefore when the plate is rotated about the bracket, the position of the edge facing the rear of the wheelchair changes greatly. If the bracket were more centrally mounted on the plate, a smaller change would occur upon rotation of the plate. If the bracket were exactly centered, rotation of the plate would have no effect. Therefore, the bracket should be mounted off-center.

In the other embodiment (FIG. 8), the footrest mounting means includes supporting means for supporting the footrest and means for permitting sliding of the footrest along the upholding means. In the exemplary embodiment, the upholding means comprises tubular member 124 attached to bracket 123. Another tubular member 125 is attached to tubular member 124, and a telescoping section 127 attached to plate 111 telescopes into and out of tubular section 125. Means would be provided to prevent rotation of the telescoping member with respect to tubular member 125 to hold the footrest flat. By telescoping the telescoping segment 127, the position of the footrest is changed.

Both embodiments allow plate 111 to be pivoted upright (FIG. 8) so that when the wheelchair is to be stowed, the footrests do not extend forward from the wheelchair so that the collapsed volume is minimized. It should also be noted that each footrest is mounted inside the plane of the respective frame means to minimize the width of the wheelchair.

The footrest mounting means also comprises housing means 121 on frame member 10. Tubular means 122 telescope into and out of the bottom of housing 121. Means 123 on tubular member 122 secure footrest 110 thereto. Grip means 126 connected to tubular member 122 extends upward out of housing 121 at a location where it can be reached by the user (FIG. 1). Pulling grip means 126 upward raises tubular member 122 and footrest 110.

Steering means between the tubular member and the housing rotates the tubular member in the housing when the tubular member is brought up into the housing to pivot the footrest means toward between the frame members to minimize the width of the wheelchair in the collapsed condition. The steering means in the exemplary embodiment comprises groove 128 on tubular member 122. A key 129 on housing 121 extends from the housing into groove 128. As shown in FIG. 8, groove 128 is curved so that when grip 126 is raised, tubular member 122 rotates slightly to accommodate key 129 in the curving groove 128. By proper arrangement of groove 128, when the telescoping section 127 reaches its top position, the footrest will be oriented in the FIG. 8 position.

The portion of the tubular member 122 within housing 121 may have means for holding the tubular member at a given extension. Any number of systems could be used for this purpose. For example, groove 128 could have a plurality of smaller grooves intersecting and extending perpendicularly to groove 128. Key 129 could slide into these plurality of grooves by rotation of tubular member 122. With key 129 out of the main groove 128, axial movement of the tubular members would not occur. A set screw or other lock could also be provided.

Frame member 10 has a forward edge 21 sloping forward from the top to the bottom of the frame members. The housing is mounted on the forward edge 21 of frame member 10 for supporting the footrest 110 at a location appropriate for the user's foot. Housing 121 is mounted parallel to the sloping edge so that movement of grip means 126 moves the footrest horizontally and vertically. In the exemplary embodiment, the inclination of housing 121 provides for a vertical and horizontal displacement of footrest 110 when tubular member 122 is telescoped into and out of housing 121.

Transfer Panel

Figure 14:
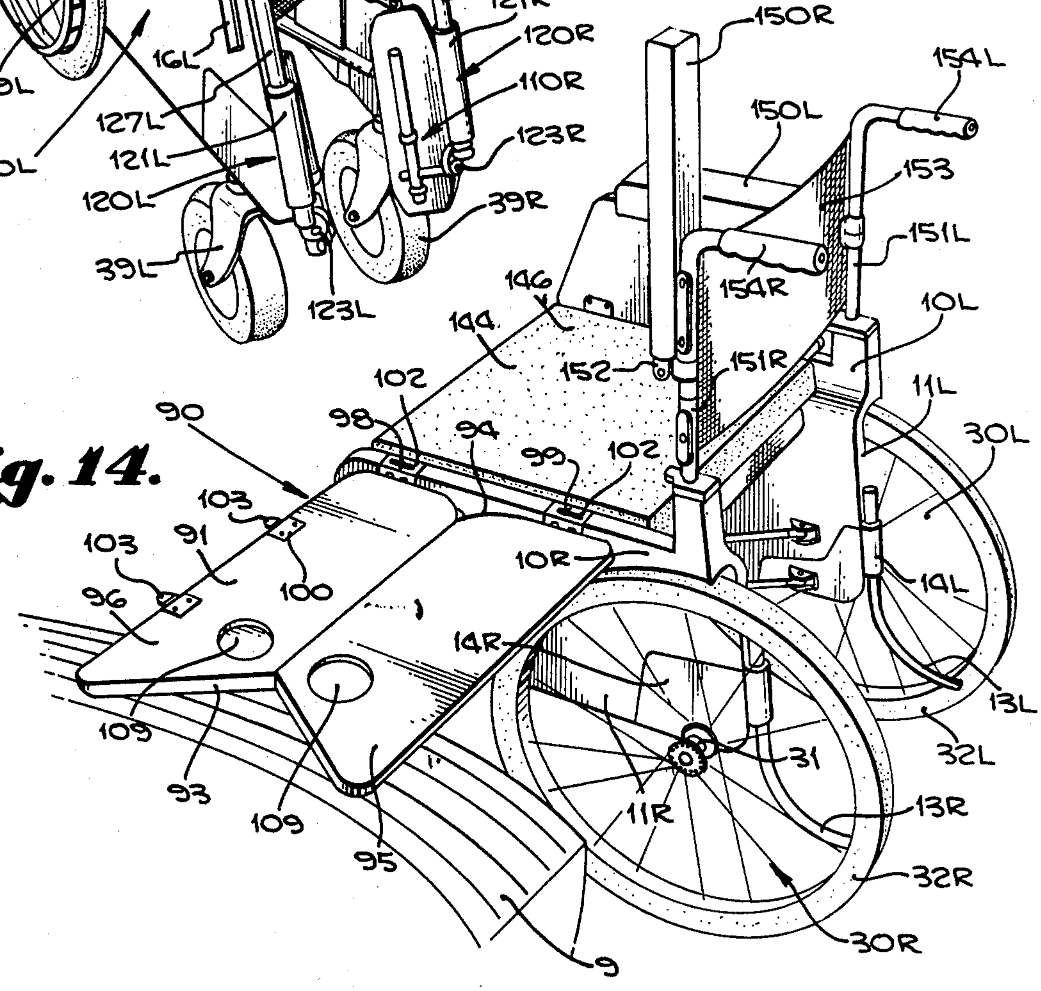

Another important feature of the present invention is the provision of having side members extending generally upward from the seat. For clarity sake, side members 90 are described as having a first set of edges 91 and 92 on opposite sides of side member 90 and a second set of edges 93 and 94 adjacent to edges 91 and 92 (FIG. 7). Side mounting means on frame member 10 and on side member 90 mount one edge 91 of the first set of edges 91, 92 to frame member 10 at a first position (FIGS. 1, 7 and 13.) In the first position, side members 90 extend generally upward from the frame members 10. Ths side mounting means also mounts one edge 94 of the second set of edges 93, 94 of the side members to the frame members at a second position (FIG. 14). At the second position, side member 90 extends generally outward from the frame members to act as a transfer panel allowing the user to slide from the wheelchair seat along the transfer panel to a remote location.

Side members 90 comprise inside panel member 95 and outside panel member 96. Hinge means (FIGS. 2, 7) permit folding inside and outside panel members 95, 96 relative to each other.

In the first position, outside panel member 96 is folded over inside panel member 95 in the position shown in FIG. 1. In order to use side member 90 as a transfer panel, the inside panel member and outside panel member are unfolded along hinge 97 to the FIG. 14 configuration. This is accomplished by rotating side member 90 so that the hinge extends outward from the wheelchair opening panel members 95 and 96 relative to each other.

The side mounting means comprises a first set of at least two frame bracket members 98 and 99. An equal number of panel bracket members 100 and 101 on one edge 91 of the first set of edges are mounted on one of the panel members and are spaced apart to coincide with the spacing of frame bracket members 98 and 99 for supporting the side members in the first position by being supported by the frame brackets. In the exemplary embodiment, frame bracket members 98 and 99 include apertures 102 into frame members 10. Side bracket members 100 and 101 have a tongue 103 (FIG. 14) that fit into apertures 102. The interaction of brackets 98 and 99 with side brackets 100 and 101 support side member 90 in the FIG. 7 configuration.

Figure 2:
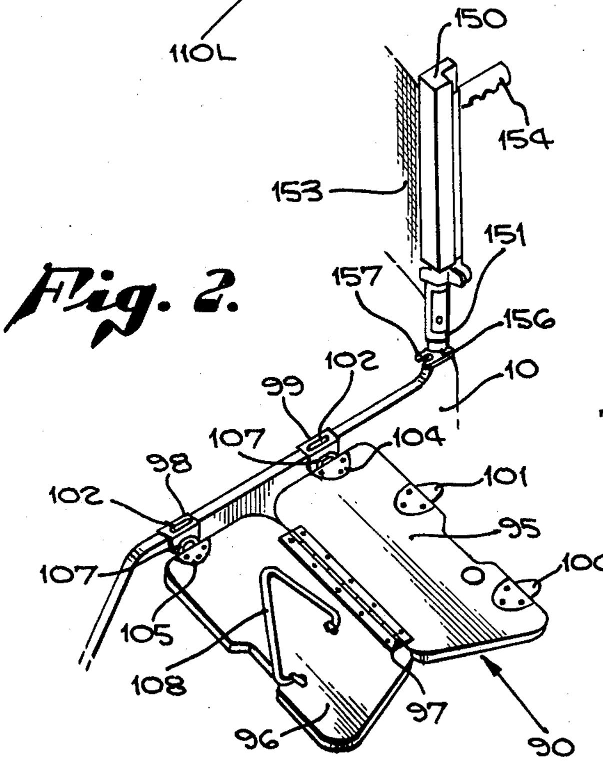
Figure 15:
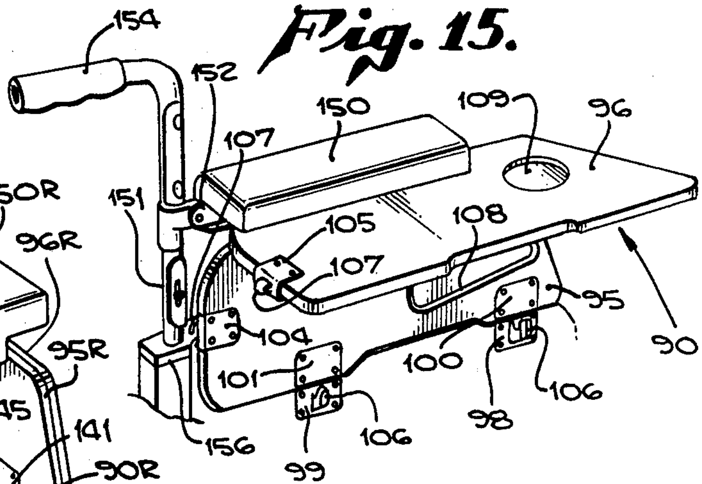

The side mounting means also includes a second set of panel bracket members equal in number to the number of frame bracket members and being on one edge of the second set of edges of the side members. They are spaced apart to coincide with the frame bracket members. Each frame bracket member has means for mounting at least one panel bracket member of the second set of panel bracket members thereon to support the side members in the second position. Although FIG. 2 shows side member 90 upside down, it helps clarify how frame bracket members 98 and 99 support side member 90 through the second set of panel bracket members 104 and 105. Because the side member is adapted to be hinged open when mounted in the second position, one panel bracket member of the second set of panel bracket members is mounted on inside panel member 95 and the other bracket is mounted on outside panel member 96. They are spaced apart a distance equal to the spacing of frame bracket members 98 and 99. Each frame bracket 98 and 99 has a hook 106 (FIG. 15). Each panel bracket member 104 and 105 of the second set of panel bracket members has an eye 107 (FIGS. 2 and 15) for being received within hook 106. In that position, side member 90 in its second position extends outward from the wheelchair. The hooks on brackets 98 and 99 and the eye on brackets 104 and 105 are such that in the FIG. 14 position, the top of side member 90 is generally flush with the top of frame member 10 to permit easy transfer along frame member 10 to the remote location, vehicle seat 9.

The wheelchair also includes armrest means and arm mounting means for mounting the armrest on the wheelchair for pivoting between a down position resting on the side members in their first position and an up position allowing removal of the side members from the side mounting means. The down position in the preferred exemplary embodiment is shown in FIGS. 1 and 7, and in FIG. 14, one armrest is in the down position while the other is in the up position.

The wheelchair of the present invention includes back brace means for supporting the back of the chair. In the exemplary embodiment, the back brace means comprises rear pillars 151 extending upward from frame 10 at the rear thereof. Pillars 151 are curved near the top and terminate in handles 154 for pushing the wheelchair. Armrest 150 pivots on bracket 152 mounted to pillar 151. The fabric or plastic back 153 is supported between the pillars 151L and 151R. Conventional fastening means 155 on each pillar secure back 153 to the pillars.

Means are provided for supporting the outside panel member perpendicularly outward from the inside panel member when the inside panel member is in the first position to act as a tray for supporting objects. In the exemplary embodiment, the means for supporting the outside panel member includes support 108 (FIGS. 2 and 15). It is pivotally attached in the exemplary embodiment to outside panel member 96. Outside panel member 96 can be pivoted with respect to inside panel member 95 when the inside panel member is in the first position (FIG. 15). Thereafter, support 108 would be pivoted downward to brace outside panel member 96 so that it could act as a tray. An indentation 109 may be provided for supporting cups, glasses or other small objects.

Back bracket means on the back brace means holds the side members in the first position. In order to provide for more strength to hold the side members in the first position, a third support is used with the interaction between brackets 98 and 100, and 99 and 101 being the first two supports. The back bracket means is shown in FIG. 7. It is mounted in a position such that when the panel members 95 and 96 are mounted in the first position with the panel members folded over each other, the second set of panel brackets 104 and 105 fit within space 157 and bracket 156 (FIG. 2). When panel member 96 is opened to become a tray, bracket 104 is held between space 157 on bracket 156 while bracket 105 is in the up position with panel member 96. This arrangement still provides significant support for the side members.

Pillars 151 could be pivotally mounted in frame 10 to pivot back bracket means 156 out of the position supporting the side members. Pillar 151 would also have a keying lock system so that the pillars could be locked. Seat back 153 could be fastened with fasteners 155 when the pillars are rotated, or the seat back could be attached to the pillars when the wheelchair is in the collapsed condition.

The side member mounting system is an important part of the present invention, and many of the features of other elements of the wheelchair improve the side member mounting system. For example, by having the side members in the outward position supported by brackets which had been at the rear of the side members when they had been in the upright position, the width of the side members from front to back can be minimized while the outward reach of the side member can be maximized to allow a longer throw between the wheelchair and the remote location. The narrower front to back distance in the outward position (FIG. 14) prevents interference by the side members with wheel 30. Prior wheelchairs have had difficulty in preventing this interference. Wheel 30 is also mounted somewhat to the rear of conventional wheels and made somewhat smaller. Because of the lightweight frame of the present wheelchair, the user can propel the wheelchair using smaller wheels. Moreover, the present design with the wheels indented into well 11 mounts the wheels closer to the user.

The Seat System

Platform means and means for mounting the platform means between the frame members have been provided. In the exemplary embodiment, platform means 141 is mounted between frame members 10. The platform means comprises pit means 143 for supporting cushion 144 therein. Cushion 144 includes a lower cushion means 145 (FIGS. 6 and 13) in pit 143 for cushioning the seat. The lower cushion 145 has a dimension such that it is flush with the upper surface of platform means 141 so that the seat means presents a continuous surface to the user.

Upper cushion means 146 on the upper surface of platform 141 and on the lower cushion 145 cushions the seat means for the user. The upper cushion 146 and the lower cushion 145 may be connected together by means of an adhesive or other mechanical connection so that the pit 143 holds lower cushion 145 to prevent the upper cushion 146 from sliding on platform 141. The lower and upper cushions 145 and 146 may be formed of one piece of foam material. The upper and lower cushion means could also be of different densities to offer different cushioning to the user. Different cushion densities may be important to prevent sores from forming on persons confined to wheelchairs.

Platform means 141 is mounted between the frame members 10. In the exemplary embodiment, a suitable bracket 142 is fastened to frame member 10 (FIG. 7) for supporting the platform on the frame member 10. The platform is mounted below the top of each frame member in a position wherein the top of the cushion is flush with the top of the frame member when the cushion is on the platform to allow for each egress and ingress out of and into the chair. In the exemplary embodiment of FIG. 14, upper cushion 146 is shown flush with the top of frame member 10 which in turn is generally flush with the surface of side member 90. When the user is transferring from the wheelchair to remote location 9, he does not have to climb over any obstacles in the seat.

Operation

The operation of some of the features of the wheelchair of the present invention is explained below. For example, the wheelchair is collapsed by the following method. Releasable anchor 52 on each brace member 41 and 42 is released from a frame member 10. The brace members are pivoted about an anchor 44 and 45 on opposite frame members from the frame members to which the bracket was released. The pivoting of the brace members is done about a vertical axis. The brace members are also pivoted to each other about a vertical axis 43 extending through both brace members. The chair is then in a position to be collapsed and by sliding bracket 52 along a track 59 and 60 on each frame member, the chair can be collapsed.

The present invention also includes a method of supporting a seat between two spaced apart frame members. A piece of material is formed with a pit therein. The material is supported between the two spaced apart frame members with the pit extending downward. Cushioning is mounted on the material, and the cushioning has at least a portion extending into and conforming to the pit to prevent sliding of the cushioning on the material.

The wheelchair of the present invention also teaches a method of transferring a user of a chair from the seat of a chair to a remote location when the seat has a pair of spaced apart frame members and a seat between the frame members. Fittings are provided on side members and on the frame members. The fittings for the side members are mounted in the fittings for the frame member in a position such that the side members extend upward from the frame members. In order to mount the side members facing outwardly, the side member fittings are removed from the frame member fittings. The side members are rotated 90 degrees about both the vertical and horizontal axes. The side members are then mounted back at the top of the frame members extending outward from the chair to act as transfer panels from the seat to a remote location. The side members are hinged in the center so that part of the side member is hinged over the remaining part along an edge opposite the edge contacting the top of the frame members when the side members are in the upright position. When the side members are to be moved to their outward position, the side members are unhinged. Also, while the side members are in the upright position, the folded over portion of the side members may be unhinged to extend outwardly from the top of the side members to act as a tray. The outwardly extending side member would then be propped against the other portion of the side members so that it will support objects.

The last method discussed with relationship to the chair of the present invention is the method for adjusting the outward position of the footrest. The footrest is provided with at least one lip extending from a surface of the footrest at one end thereof. Another lip is provided projecting from the opposite surface of the footrest at an end opposite the end to which the first-mentioned lip is mounted. The footrest is mounted in a position where the user's foot can rest thereon with the first-mentioned lip being positioned toward the back of the foot. The footrest is rotated about an axis off-center of the footrest so that the second-mentioned lip is in a position different from the first-mentioned position of the first-mentioned lip with the surface facing the user being in the same plane.

The present invention has been explained with specific detail toward the exemplary embodiment. However, it will be recognized that various modifications and changes may be made in the configuration of the wheelchair described above which may come within the spirit of this invention. All such changes and modifications coming within the scope of the appended claims are embraced thereby. The present invention meets all of the objects stated for it above, and other objects evident in the disclosure are also met.

I claim:

1. A wheelchair comprising a pair of frame members, each formed of one piece of material; a pair of wheels; well means indented into the frame members for accommodating a wheel therein and mounting means for mounting a wheel for rotation in each well means; brace means for supporting the frame members in a spaced apart, open position and allowing the frame members to be brought together to a collapsed position comprising a pair of brace members and vertical pivot means for pivotally mounting the brace members with respect to each other at a central portion of each brace member about a vertical axis; anchoring means on each frame for anchoring one end of the brace members to a frame member for pivoting the brace member with respect to the frame member about a vertical axis; releasable anchoring means for releasably anchoring the second end of the brace members to the frame member opposite the one to which the one end of the brace member is anchored; brake means mounted on the frame members for movement against the wheels for preventing rotation of the wheels; hill holder means connected to the brake means for preventing movement of the wheels in one direction; a handle movable between at least two positions, wherein in the first position, the handle moves the brake means against the wheel to stop the wheelchair and in the second position moves the hill holder means against the wheel to prevent movement of the wheelchair in one direction; an indentation on each frame member adjacent the well means for mounting the handle in the indentation, slot means through the frame member for allowing the brake means to pass through the well means upon movement of the handle to the first position and for allowing the hill holder means to pass through the well means upon movement of the handle to the second position; side members; means for mounting the side members on the top of the frame members in a first position wherein the side members extend vertically from each frame member and in a second position wherein the side members extend horizontally from the frame members; footrest means; means for mounting the footrest means on the frame members including a housing, telescoping means extending downward from the housing and having a mounting bracket for mounting the footrest means thereon, a grip on the top part of the housing, the grip being connected to the telescoping means and being positioned within reach of the user whereby pulling the grip raises the footrest means; a seat between the frame member for supporting a user between the frame members comprising a platform mounted below the top of the frame members, a pit in the platform and a cushion on the platform extending into the pit and being generally flush with the top of the frame members.

2. In a wheelchair having a pair of wheels and a pair of frame members, each frame member having wheel mounting means for supporting one wheel on each frame member, collapsible brace means connecting the frame members together and adapted to hold the frame members in an open position when the wheelchair is to be occupied and a collapsed position for storage of the wheelchair, each frame member being formed of one piece of material, the improvement comprising the provision of each frame member having well means indented into each, and the wheel mounting means mounts the wheel in the well means to minimize the width of the wheelchair and to prevent the wheels from throwing mud and water.

3. In a wheelchair having a pair of wheels and a pair of frame members, each frame member having wheel mounting means for supporting one wheel on each frame member, collapsible brace means connecting the frame members together and adapted to hold the frame members in an open position when the wheelchair is to be occupied and a collapsed position for storage of the wheelchair, each frame member being formed of one piece of material, the improvement comprising the provision of having the brace means comprising a pair of brace members; vertical pivot means on the brace members for mounting the brace members to pivot with respect to each other at a central portion of each brace member about a vertical axis; anchoring means on each frame member for anchoring one end of one brace member to a frame member for pivoting the brace members with respect to the frame member about a vertical axis; and releasable anchoring means for releasably anchoring the second end of the brace members to the opposite frame member than the one to which the one end of the brace member is anchored.

4. The improvement of claim 3 wherein the releasable anchoring means comprises fastening means for anchoring the brace members at one of at least two locations on the frame members whereby at one location, the wheelchair is in the open condition, and at the other location the wheelchair is in the collapsed condition; the fastening means comprises an aperture in each frame member and a buckle on each brace member having a probe for being received within the aperture, the buckle having means to move the probe into and out of the aperture; and guide means for supporting the buckle adjacent the aperture so that the probe is urged into the aperture to secure the brace members to the releasable anchor.

5. In a wheelchair having a pair of wheels and a pair of frame members, each frame member having wheel mounting means for supporting one wheel on each frame member, collapsible brace means connecting the frame members together and adapted to hold the frame members in an open position when the wheelchair is to be occupied and a collapsed position for storage of the wheelchair, each frame member being formed of one piece of material, the improvement comprising the provision of:

brake means on the frame means movable against the wheels for stoping rotation of the wheels when the brake means is against the wheel, a handle attached to the brake means for moving the brake means into and out of the position against the wheel, brake handle mounting means on the frame member for mounting the brake handle means to the frame member in a location where it can be reached by the user, the brake handle mounting means comprising an indentation in the frame members in which the brake handle means is mounted, the indentation being adjacent the wheel well so that the brake means extends through the wall of the wheel well when the brake means is against the wheel.

6. The improvement of claim 5 further comprising hill holder means on the frame member for preventing rearward movement of the wheelchair while permitting forward movement thereof, the hill holder means comprising a cam to engage the wheel and cam mounting means for mounting the cam adjacent the wheel such that wheel rotation in a direction moving the wheelchair forward causes the cam to pivot in a first direction out of the way of the rotating wheel to travel along it and wheel rotation in a direction moving the wheelchair rearward causes the cam to pivot in a second direction opposite to the first direction to engage the wheel and prevent rotation, the handle moving the cam into and out of a position where it contacts the wheel, a plate on the frame members for mounting the brake means and the cam at separate locations on the plate whereby movement of the handle in one direction moves the brake means into engagement with the wheel and movement of the handle in the opposite direction causes the cam to contact the wheel.

7. In a wheelchair having a pair of wheels and a pair of frame members, each frame member having wheel mounting means for supporting one wheel on each frame member, collapsible brace means connecting the frame members together and adapted to hold the frame members in an open position when the wheelchair is to be occupied and a collapsed position for storage of the wheelchair, each frame member being formed of one piece of material, the improvement comprising the provision of having:

the frame members have a forward edge sloping forward from the top to the bottom of the frame members, a footrest for supporting the foot of the user and footrest supporting means on the forward edge of the frame member for supporting the footrest at a location appropriate for the user's foot, the footrest supporting means comprising a housing on the forward edge of the frame member, tubular means telescoping into and out of the bottom of the housing, a fitting on the tubular member for securing the footrest thereto, and a grip connected to the tubular member and extending upward out of the housing at a location where it can be reached by the user whereby pulling the grip upward raises the tubular member and the footrest.

8. The improvement of claim 7 wherein the housing is mounted parallel to the sloping edge of the frame.

9. The improvement of claim 8 comprising steering means between the tubular member and the housing for rotating the tubular member in the housing when the tubular member is brought up into the housing to pivot the footrest toward between the frame members to minimize the width of the wheelchair in the collapsed condition.

10. In a wheelchair having a pair of wheels and a pair of frame members, each frame member having wheel mounting means for supporting one wheel on each frame member, collapsible brace means connecting the frame members together and adapted to hold the frame members in an open position when the wheelchair is to be occupied and a collapsed position for storage of the wheelchair, each frame member being formed of one piece of material, the improvement comprising the provision of:

side members extending generally vertically from the seat, side mounting means on the frame members for mounting one edge of the side members to the top of the frame members so that the outside walls of the frame members and side members are in the same plane, and wherein the side members have a first set of edges on opposite sides of the side members and a second set of edges, each adjacent to an edge of the first set of edges, the side mounting means mounting one edge of the first set of edges of the side members to the frame members at a first position wherein the side members extend generally upward from the frame members and for mounting one edge of the second set of edges of the side members to the frame members at a second position wherein the side members extend generally outward from the frame members to act as transfer panels allowing the user to slide from the wheelchair seat along the transfer panel to a remote location.

11. The improvement of claim 8 further comprising well means indented into the frame members and having means for mounting a wheel for rotation in the well means, the well means being positioned such that the wheel does not block the side members from extending outward from the frame members in their second position.

12. In a wheelchair having a pair of wheels and a pair of frame members, each frame member having wheel mounting means for supporting one wheel on each frame member, collapsible brace means connecting the frame members together and adapted to hold the frame members in an open position when the wheelchair is to be occupied and a collapsed position for storage of the wheelchair, each frame member being formed of one piece of material, the improvement comprising the provision of:

a seat between the frame members comprising a platform and means on the frame members below the top thereof for mounting the platform between the frame member, a pit in the platform and a cushion extending into the pit, the pit preventing movement of the cushion along the platform, the cushion extending along the platform and the top of the cushion being aligned with the top of the frame members.

13. In a wheelchair having a pair of frame members, a seat between the frame members, and brace means between the frame members for supporting the frame members in a spaced apart, open position and allowing the frame members to be brought together to a collapsed position, the improvement comprising:

the brace means comprising a pair of brace members and vertical pivot means for mounting the brace members with respect to each other at a central portion of each brace member about a vertical axis, anchoring means on each of the frame members for anchoring one end of one of the brace members to said each one of the frame members for pivoting the each of the brace members with respect to the frame member about a vertical axis, and releasable anchoring means for releasably anchoring the other end of each of the brace members to the frame member to which the one end of the brace member is anchored.

14. The improvement of claim 13 wherein each brace member is curved outwardly toward its releasable anchoring means from the vertical pivot means whereby the brace members can reach the releasable anchoring means when the wheelchair is in the collapsed condition.

15. The improvement of claim 13 wherein each brace member is S-shaped curving outwardly from the vertical pivot means to the releasable anchoring means and to the anchor means whereby the brace member can reach the releasable anchoring means and the anchor means when the wheelchair is in the collapsed condition.

16. The improvement of claim 13 wherein each brace member comprises a pair of tubular members, one being above the other and being parallel to each other and having a vertical stay means connected to both tubular members for supporting the brace members.

17. The improvement of claim 13 wherein the releasable anchoring means comprises fastening means for anchoring the brace members at one of at least two locations on the frame members whereby at one location, the brace members support the frame members in the open condition, and at the other location the brace members support the frame members in the collapsed condition.

18. The improvement of claim 17 wherein the fastening means comprises an aperture in each frame member, a buckle on each brace member having a probe for being received within the aperture and having means to move the probe into and out of the aperture, and guide means on the frame members for supporting the buckle adjacent the aperture so that the probe is urged into the aperture to secure the brace members to the releasable anchor.

19. The improvement of claim 18 further comprising spring means on the buckle for biasing the probe into the aperture when the probe is adjacent to the aperture.

20. The improvement of claim 18 further comprising linkage means positioned within reach of the user in the wheelchair for connecting the two handles on the brace members whereby when the linkage is pushed or pulled, the linkage rotates the handles to generally simultaneously remove both probes from the apertures in the frame members.

21. The improvement of claim 18 wherein the fastening means comprises at least three apertures on each frame member, one aperture being mounted to anchor the brace means to the frame member when the frame members are in the collapsed condition and a set of at least two other apertures for adjusting the distance which the frame members are spaced apart by the brace members.

22. The improvement of claim 21 further comprising programming means for covering at least one aperture of the set of apertures for preventing the probe from entering the covered aperture so that the brace members will not be stopped from opening and collapsing when the probe would have entered the covered aperture.

23. The improvement of claim 18 wherein the frame members each are one-piece members, the apertures being formed in the solid members.

24. The improvement of claim 23 further comprising means for mounting the guide means to the inside of the panel and means for mounting the probe between the guide means and the inside face of the panel.

25. The improvement of claim 23 wherein the frame members are formed of foamed plastic.

26. In a wheelchair having a pair of frame members and a main wheel mounted for rotation on each frame member, brace means attached to the frame members for separating the frame members, a seat between the frame members for supporting the user, brake means on the frame members movable against the wheel for preventing rotation of the wheels to brake the wheelchair, and hill holder means on the frame members for preventing movement of the wheels in one direction to allow wheelchair movement in the forward direction and to prevent movement of the wheelchair in the rearward direction, the improvement comprising the provision of:

the hill holder means comprising a cam contacting the wheel; cam mounting means for mounting the cam for pivoting adjacent the wheel such that the wheel pivots the cam in a first direction out of the way of the rotating wheel to travel along it when the wheel rotates in a direction moving the wheelchair forward, the wheel pivots the cam in a second direction opposite to the first direction to engage the wheel and prevent rotation thereof when the wheel rotates in a direction moving the wheelchair rearward.

27. The improvement of claim 26 comprising a handle movable between at least two positions being connected to the cam and to the brake means whereby movement of the handle to a first position moves the brake means against the wheels and the cam away from the wheels and movement of the handle to a second position urges the brake means away from the wheels and the cam against the wheels.

28. The improvement of claim 27 wherein the frame members are each formed of one piece of material, well means indented into the frame members for mounting the wheels therein, the well means having a well wall generally curved around the wheel to act as a mudguard, a slot through the well wall, and means for mounting the cam and the brake means on the frame members for projection through the slot through the well wall into and out of engagement with the wheel.

29. The improvement of claim 28 further comprising an indentation on each frame member adjacent the well means near the seat, and handle mounting means in the indentation for mounting the handle on the frame members in the indentation to prevent the handle from projecting from the frame member and for mounting the handle within reach of the user.

30. In a wheelchair having a pair of frame members, brace means attached to the frame members for supporting the frame members in a spaced apart, open position, a seat between the frame members for supporting the user and a footrest attached to each frame member for supporting the user's foot, the improvement comprising:

footrest mounting means attached to each frame member for mounting the footrest in a plane for accommodating the user's foot and for movement forward and backward in the same plane.

31. The improvement of claim 30 wherein:

the footrest comprising a plate for supporting the user's foot and first lip means on one end of one surface of the plate, the footrest mounting means mounting the footrest such that the first lip means faces upward at the rear of the plate to prevent the user's foot from falling off the footrest, the footrest having a second lip means on the other surface of the plate at the end opposite the first lip means, the footrest mounting means allowing rotation of the footrest one end over the other to present either the first or the second lip means upward to provide a support to prevent the user's foot from sliding off the footrest.

32. The improvement of claim 31 wherein the footrest mounting means rotates the footrest about an axis away from the center of the footrest to change the position of the lip means presented toward the user.

33. The improvement of claim 30 wherein the footrest mounting means comprises a bracket attached to each frame member, a tubular member attached to the bracket for supporting the footrest, and a sliding connection between the footrest and the tubular member for permitting sliding of the footrest along the tubular member.

34. In a wheelchair having a pair of frame members, brace means attached to the frame members for supporting the frame members in a spaced apart, open position, a seat between the frame members for supporting the user, a footrest attached to each frame member for supporting the user's feet, and footrest supporting means for supporting the footrest on the frame members, the improvement comprising:

the footrest supporting means comprising a housing on each frame member, a tubular member telescoping into and out of the housing, a bracket on the tubular member for securing the footrest thereto, a grip connected to the tubular member and extending upward out of the housing at a location where it can be reached by the user whereby pulling the grip upward raises the tubular member and the footrest.

35. The improvement of claim 34 comprising a steering means between the tubular member and the housing for rotating the tubular member in the housing when the tubular member is brought up into the housing to pivot the footrest toward between the frame members to minimize the width o the wheelchair in the collapsed condition.

36. The improvement of claim 34 wherein the frame members have a forward edge sloping forward from the top to the bottom of the frame members, and the housing is mounted on the forward edge of the frame member for supporting the footrest at a location appropriate for the user's foot.

37. The improvement of claim 36 wherein the housing is mounted parallel to the sloping edge whereby movement of the grip moves the footrest vertically and horizontally.

38. In a wheelchair having a pair of frame members, a seat between the frame members, brace means between the frame members for supporting the frame members, a main wheel on each of the frame members for propelling the wheelchair and side members extending generally vertically from the frame members, the side members having a first set of edges on opposite sides of the side members and a second set of edges, each adjacent to an edge of the first set of edges, the improvement comprising:

side mounting means on the frame members and the side members for mounting one edge of the first set of edges of the side members to the frame members at a first position wherein the side members extend generally vertically upward from the frame members and for mounting one edge of the second set of edges of the side members to the frame members at a second position wherein the side members extend generally horizontally outward from the frame members to act as transfer panels allowing the user to slide from the wheelchair seat along the transfer panel to a remote location.

39. The improvement of claim 38 wherein the side members comprise inside and outside panel members and a hinge means connecting the inside and the outside panel members together for folding the inside and the outside panel members over each other.

40. The improvement of claim 39 wherein the side mounting means comprises a first set of at least two frame bracket members spaced on the frame members, and an equal number of panel bracket members on one edge of the first set of edges of the side members on one of the panel members and spaced apart to coincide with the frame bracket members for supporting the side members in the first position by being supported by the frame bracket, and a second set of panel bracket members equal in number to the number of frame bracket members and being on one edge of the second set of edges of the side members and being spaced apart to coincide with the frame bracket members, each frame bracket member having means for mounting at least one panel bracket member of the second set of panel bracket members thereon to support the side members in the second position.

41. The improvement of claim 40 wherein the frame members are generally formed of one-piece of material, the frame bracket members being mounted on the top of each frame member and having a slot extending into the frame members, each panel bracket member having a tongue extending into the slot for supporting the side members.

42. The improvement of claim 40 comprising means for supporting the outside panel member perpendicularly outward from the inside panel member when the inside panel member is in the first position to act as a tray for supporting objects.

43. The improvement of claim 40 comprising back brace means on each frame member for supporting a chair back therebetween, means for mounting the back brace means vertically upward from the frame members, and back-bracket means on the back brace means contacting the side members in the first position for holding the side members in the first position.

44. The improvement of claim 43 further comprising means for mounting the back bracket means in a position on the back brace means such that the two panel bracket members, one on each panel member, contact the back bracket means to support the panel bracket members for supporting the side members.

45. The improvement of claim 43 wherein the back bracket means includes means for mounting the back bracket means for holding at least one panel bracket member on the first set of edges of the side members.

46. The improvement of claim 45 comprising means for pivoting the back bracket means on the back brace means to move the back bracket means out of the position supporting the side members.

47. The improvement of claim 38 wherein the frame members comprise one piece of material, well means at the rear of the frame members for supporting the main wheels, and means for mounting the well means for preventing interference of the side members in the second position by the wheels.

48. The improvement of claim 38 further comprising an armrest and arm mounting means for mounting the armrest on the wheelchair for pivoting between a down position resting on the side members in their first position and an up position allowing removal of the side members from the side mounting means.

49. In a wheelchair having a pair of frame members, brace members attached to the frame members for supporting the frame members and a seat between the frame members for supporting the user, the improvement in the seat comprising:

a cushion, a platform mounted between the frame members having a pit for supporting the cushion therein, the cushion having a lower portion extending into the pit for cushioning the seat, the lower portion having a dimension such that it is flush with the upper surface of the platform so that the seat presents a continuous surface to the user.

50. The improvement of claim 49 further comprising an upper cushion portion on the upper surface of the platform and on the lower cushion for cushioning the seat for the user.

51. The improvement of claim 50 comprising means for connecting the upper portion of the cushion and the lower portion of the cushion together so that the pit holds the lower portion of the cushion to prevent the upper portion of the cushion from sliding on the platform.

52. The improvement of claim 51 wherein the upper portion of the cushion and the lower portion of the cushion are of different densities to offer different cushioning to the user.

53. The improvement of claim 50 further comprising side members and means for mounting the side members on the top of the frame members at two different orientations wherein at the first orientation, the side members extend vertically upward from the frame members to act as sides to the seat and at the second position the side members extend horizontally outward from the frame member generally even with the top of the upper portion of the cushion to act as a transfer panel to permit the user to slide from the seat along the panel to a remote location.

54. The improvement of claim 49 wherein the frame members are each formed of one piece of material, platform mounting means on each frame member below the top of each frame member for mounting the platform below the top of each frame member in a position wherein the top of the cushion is flush with the top of the frame member when the cushion is on the platform to allow for easy egress and ingress out of and into the chair.

55. A method of collapsing a wheelchair having opposed frame members and a pair of brace members, pivotally connected to each other about a vertical axis, supporting the frame members in an open condition, each brace member being held to one frame member by a bracket and to the other frame member by an anchor, comprising:

(a) releasing the brackets from securing each brace member from one frame member;

(b) pivoting each brace member about its anchor on opposite frame members from the frame member from which the bracket was released, the pivoting being done about a vertical axis; and (c) pivoting the brace member with respect to each other about the vertical axis through both brace members.

56. The method of claim 55 further including the step of sliding the bracket along a track on each frame member while pivoting the brace members about the anchors and the vertical axis through both brace members.

* * * * *

UNITED STATES PATENT AND TRADEMARK OFFICE

CERTIFICATE OF CORRECTION

PATENT NO. : 4,101,143

DATED : July 18, 1978

INVENTOR(S) : William J. Sieber

It is certified that error appears in the above-identified patent and that said Letters Patent are hereby corrected as shown below:

Column 7, line 10, change "76" to --75--; line 22, change "75" to --76--. Column 17, line 5, change "each" to --easy--. Column 21 (within claim 11), line 31, change "8" to --10--.

Signed and Sealed this

*Twenty-seventh* Day of *March 1979*

[SEAL]

*Attest:*

RUTH C. MASON
*Attesting Officer*

DONALD W. BANNER
*Commissioner of Patents and Trademarks*